Jan. 15, 1957  F. R. ERICSON  2,777,466
VALVE MECHANISM
Filed Oct. 28, 1955
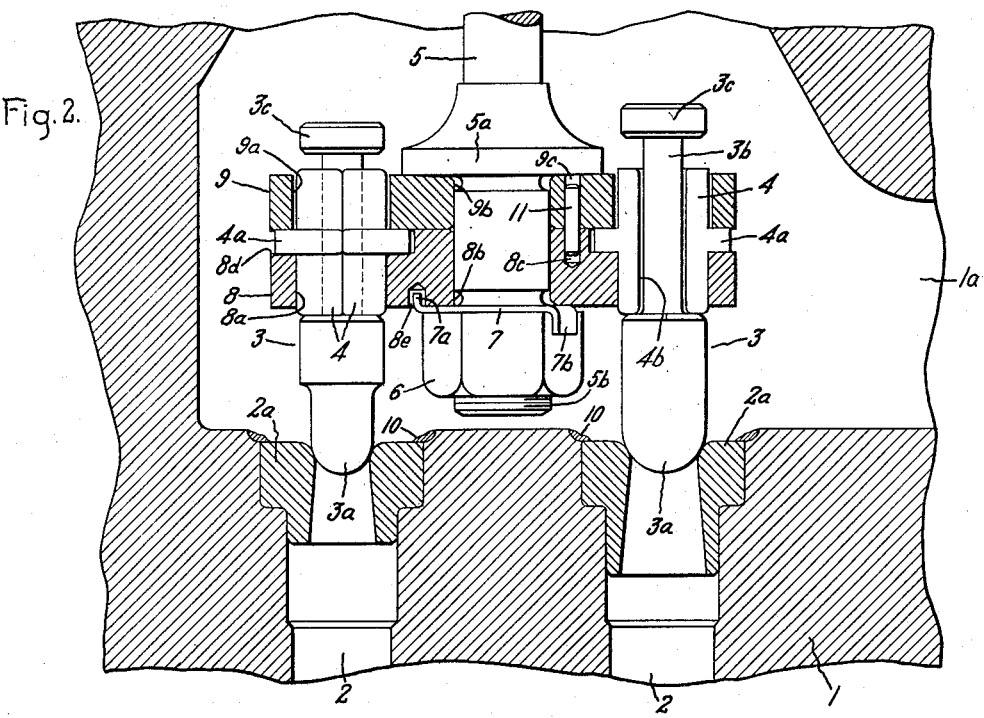
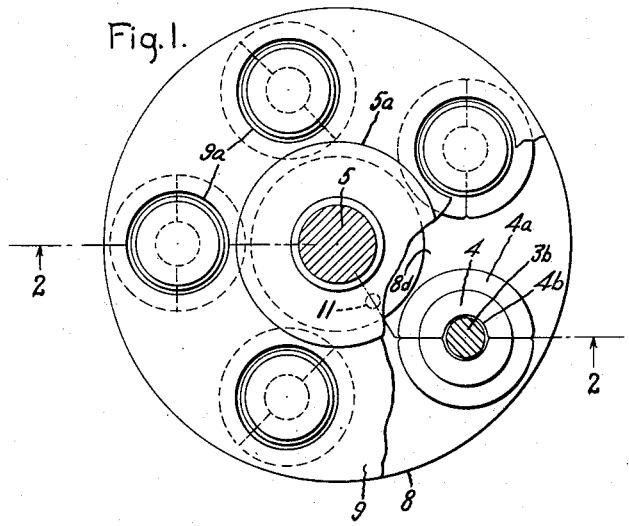
INVENTOR.
FRANKLIN R. ERICSON
BY
Kiess
HIS ATTORNEY

United States Patent Office 2,777,466
Patented Jan. 15, 1957

1

2,777,466

VALVE MECHANISM

Franklin R. Ericson, Leominster, Mass., assignor to General Electric Company, a corporation of New York Application October 28, 1955, Serial No. 543,350

3 Claims. (Cl. 137—630.15)

This invention relates to valve mechanisms for controlling the flow of elastic fluid, particularly to valve arrangements in which a plurality of individual valves are arranged to be successively opened and closed to regulate the flow of fluid to a turbine.

In the typical high pressure turbine, the flow of steam through the turbine is controlled by a plurality of control valves which may be located "in line," as indicated in the United States patent to F. H. Van Nest et al, No. 2,613,542, or along the outer portions of a circular disk as disclosed in the United States patent to D. F. Warner, No. 2,177,544. In either instance, the valves are successively moved to an open position by a lifting rod secured to the members in which the valves are supported. This successive valve operation is accomplished by making the valve heads with stems of different lengths and securing thereto an abutment member to be contacted by the lift member. During the upward movement of the member it contacts the abutment members connected to the valve stems to successively lift the valve heads from their seats. These abutment members are normally nuts threaded on the valve stems. This type of connection gives rise to the possibility that during extended operation of the valve mechanism the nuts may separate from the valve stem and damage the turbine.

Accordingly, it is an object of this invention to provide a valve control assembly that includes unitary valve head members, with no small separable members which might accidentally come off and go through the turbine.

Other objects and advantages will become apparent from the following description taken in connection with the accompanying drawings, in which Fig. 1 is a plan view partially in section of the valve arrangement; and Fig. 2 is a sectional view taken along lines 2—2 of Fig. 1.

Generally stated, the invention is practiced by providing a valve supporting mechanism consisting of a pair of plates through which unitary valve head members are disposed and split bushings secured between the two plates for maintaining the valve heads aligned relative to their respective seats.

Referring to Fig. 2 there is illustrated a valve housing 1 having an inlet chamber 1a and a plurality of outlet ports 2. Located in the outlet ports are valve seats 2a which are secured to the housing by welds 10. Flow through the valve is controlled by valve head members 3. The valve heads 3 are solid one-piece members having a seating portion 3a, a stem 3b, and an abutment portion 3c. The valve stems 3b are of various lengths to provide for successive opening of the valves.

The valve heads 3 are supported on a disk assembly consisting of two circular plates 8, 9 which have in the present instance five aligned bores 8a, 9a uniformly spaced along its circumference. The bores 8a, 9a are larger in diameter than the largest diameter of the valve head. This permits the valve head to be made in one piece. The valve heads are prevented from being separated from the disk assembly by split bushings 4 which

2 are secured between the two plates 8, 9. Each bushing 4 has a flange portion 4a which is disposed in an annular recess 8d defined by the lower plate 8. The bushing bore 4b has a slightly larger diameter than the outer diameter of the stems 3b and has an axial length somewhat less than that of the shortest stem. The bushings serve to maintain the valve heads aligned relative to their seats. The loose fit between the stem and bushing permits the valve head to compensate for slight misalignments between the bushing and valve seat.

Upon movement of the disk assembly in the upward direction, the bushing engages the abutment portions 3c of the valve heads to successively open the valves in the order determined by the length of the valve stems. In addition, this construction permits the bushings to be made of a different material than the disk assembly if so desired.

Relative movement between the plates is prevented by a dowel pin 11 disposed in aligned openings 8c, 9c defined by plates 8, 9 respectively.

The disk assembly is secured to the lower end 5b of a lifting rod or stem 5 which has an upper end arranged for connection to some suitable governing or control mechanism, not shown. The lower end 5b extends through aligned openings 8b, 9b in the plates 8, 9. The lower rod portion 5b is threaded and a single large nut 6 is disposed thereon to secure the plates between the nut and a flange portion 5a defined by rod 5. The nut is locked by a lock-washer 7 having a first lip portion 7a disposed in a recess 8e in plate 8 and a second lip portion 7b bent into contact with a flat side of the nut 6. This locking device, plus the fact that the large nut is of a size which could not pass through the smaller steam passages 2, insures that this nut cannot damage the turbine.

The valve control assembly is assembled in the following manner.

The individual valve heads 3 and valve bushings 4 are assembled as a unit and disposed in opening 8a with the flanges 4a located in annular recess 8d. The upper plate member 9 is then put in place over the bushings 4 to maintain them secured between the upper and lower plate members 8, 9. Pin 11 is then inserted into recesses 8c, 9c to secure the plates 8, 9 against rotational movement relative to each other. The disk assembly and accompanying valves are then assembled over extention 5b of rod 5 and urged up against flange 5a. The lock washer 7 is then positioned with its ear 7a bent over into recess 8e of lower plate member 8. The nut 6 is then secured in place to lock the plates 8, 9 and accompanying bushings 4 and valves 3 into place relative to the lifting stem 5. The other ear 7b of lock washer 7 is then bent into contact with one of the flat sides of nut 6 to prevent it from rotating.

Thus it will be seen that a multiple valve assembly is provided which utilizes a plurality of integral valve head members having different stem lengths which are loosely supported by a pair of interconnected plate members. The valve heads are aligned relative to their seats by split bushings which are secured between two plate members. The valves are successively moved into open position by a control rod connected to the plates which contact abutment portions formed integral with the respective valve stems. The invention thus provides a simple, rugged assembly, easy to put together and take apart for servicing, without the use of numerous threaded members which might separate under the influence of the serious vibration conditions to which the assembly is subjected in normal operation.

While a single embodiment of the invention has been described in detail herein, it will be obvious to those skilled in the art that many changes and substitutions of equivalents might be made. For instance, the valves could be arranged in line, as in United States Patent 2,613,542, in which one of the valve head support members might consist of two flat rectangular plates and there would be two or more lift rods instead of the single rod 5 herein. Other modifications possible include increasing the diameter of openings 8a if it is desired to use larger valve heads or increasing openings 9a to permit the use of larger valve lifting portions. In such cases bushings having comparable diameters would be used.

It is, of course, desired to cover by the appended claims all such modifications as fall within the true spirit and scope of the invention.

What I claim as new and desire to secure by Letters Patent of the United States is:

1. A multiple valve comprising a housing defining a valve chamber and a plurality of outlet ports for discharging fluid from the valve chamber, each port having an inlet portion defining a valve seat, a plurality of unitary valve head members each comprising a stem portion with an enlarged seating portion at one end adapted to sealingly engage one of said valve seats, each stem having at its other end a second enlarged portion adapted to be contacted to move the valve head member to an open position, means for supporting and positioning the valve head members to regulate the flow of fluid through said outlet ports, said means comprising two plate members each defining a plurality of openings which are aligned and cooperate with corresponding openings in the other plate member to define pairs of cooperating openings in which the valve head stem portions are loosely supported, the diameter of the openings in each plate member being larger than the diameter of the adjacent valve head end portions, at least one lifting rod for moving the valve head members to open position, means securing the plates together and to the lifting rod, a longitudinally divided bushing disposed in each pair of cooperating openings in the plate members around said stem portions, said bushing and plates having cooperating abutting and interfitting portions to prevent both radial and axial displacement of the bushing portions relative to the plates, the diameter of the bushing bore being slightly larger than the valve stem whereby the valve head member is free to slide in the bushing bore and compensate for slight misalignment between the valve seat and bushing bore.

2. A multiple valve comprising a housing defining a valve chamber and a plurality of circumferentially spaced outlet ports for discharging fluid from the valve chamber, each port having an inlet portion defining a valve seat, a valve support means disposed within the valve chamber, at least one lifting rod for moving the valve supporting means in the valve opening direction, a plurality of unitary valve head members each comprising a stem portion with an enlarged seating portion at one end adapted to sealingly engage one of said valve seats, each stem having at its other end a second enlarged portion adapted to be contacted to move the valve head member to an open position, at least two of the stem portions being of different lengths, said support means comprising two plate members each defining a plurality of circumferentially spaced openings which are aligned and cooperate with corresponding openings in the other plate member to define pairs of cooperating openings in which the valve head stem portions are loosely supported, the openings in each plate member being larger than the adjacent valve head end portions, second means securing the plates together and to the lifting rod, third means for preventing the plates from rotating relative to each other, a longitudinally divided bushing disposed in each pair of cooperating openings in the plate members around said stem portions, said bushing and plates having cooperating abutting and interfitting portions to prevent both radial and axial displacement of the bushing portions relative to the plates, the diameter of the bushing bore being slightly larger than the valve stem whereby the valve head member is free to compensate for slight misalignment between the valve seat and bushing bore.

3. A multiple valve comprising a housing defining a valve chamber and a plurality of circumferentially spaced outlet ports for discharging fluid from the valve chamber, each port having an inlet portion defining a valve seat, a plurality of unitary valve head members each comprising a stem portion with an enlarged seating portion at one end adapted to sealingly engage one of said valve seats, each stem having at its other end a second enlarged portion adapted to be contacted to move the valve head member to an open position, the stem portions being of different lengths whereby the valves will be successively opened, means for supporting the valve head members to regulate the flow of fluid through said outlet ports, said means comprising first and second plate members each defining a plurality of circumferentially disposed openings which are aligned and cooperate with corresponding openings in the other plate member to define pairs of cooperating openings in which the valve head stem portions are loosely supported, the diameter of the openings in each plate member being larger than the diameter of the adjacent valve head end portions, the first plate member defining an annular recess, a longitudinally divided bushing disposed in each pair of cooperating openings in the plate members around said stem portions, said bushing defining a flange located in said recess and secured between said first and second plates, the diameter of the bushing bore being slightly larger than the valve stem whereby the valve head member is free to compensate for slight misalignment between the valve seat and bushing bore, means for preventing the plates from rotating relative to each other, said last mentioned means comprising a pin disposed in aligned bores defined by said first and second plate members, at least one lifting rod for moving the valve head members to open position, and means securing the plates together and to the lifting rod.

No references cited.